(12) United States Patent
Tran et al.

(10) Patent No.: US 9,615,066 B1
(45) Date of Patent: Apr. 4, 2017

(54) SMART LIGHTING AND CITY SENSOR

(71) Applicant: Bao Tran, Saratoga, CA (US)

(72) Inventors: Bao Tran, Saratoga, CA (US); Ha Tran, Saratoga, CA (US)

( * ) Notice: Subject to any disclaimer, the term of this patent is extended or adjusted under 35 U.S.C. 154(b) by 0 days.

(21) Appl. No.: 15/144,818

(22) Filed: May 3, 2016

(51) Int. Cl.
*H04N 7/18* (2006.01)
*H04B 1/38* (2015.01)

(52) U.S. Cl.
CPC ............... *H04N 7/183* (2013.01); *H04B 1/38* (2013.01)

(58) Field of Classification Search
None
See application file for complete search history.

(56) References Cited

U.S. PATENT DOCUMENTS

| | | | |
|---|---|---|---|
| 4,904,132 A | 2/1990 | Popenoe |
| 4,991,249 A | 2/1991 | Suroff |
| 5,386,741 A | 2/1995 | Rennex |
| 5,723,786 A | 3/1998 | Klapman |
| 5,894,620 A | 4/1999 | Polaert |
| 6,244,644 B1 | 6/2001 | Lovchik |
| 6,398,992 B1 | 6/2002 | Jacobson |
| 6,398,998 B1 | 6/2002 | Krenchel |
| 6,536,068 B1 | 3/2003 | Yang |
| 7,001,270 B2 | 2/2006 | Taub |
| 7,172,714 B2 | 2/2007 | Jacobson |
| 7,353,137 B2 | 4/2008 | Vock |
| 7,402,265 B2 | 7/2008 | Jacobson |
| 7,581,272 B2 | 9/2009 | Xie |
| 7,726,206 B2 | 6/2010 | Terrafranca |
| 8,174,934 B2 | 5/2012 | Li |
| 8,390,700 B2 | 3/2013 | Yoshizaki |
| 8,460,216 B2 | 6/2013 | Miller |
| 8,540,468 B2 | 9/2013 | Mekid |
| 8,572,764 B2 | 11/2013 | Thellmann |
| 8,715,096 B2 | 5/2014 | Cherbini |
| 8,747,336 B2 | 6/2014 | Tran |
| 8,849,620 B2 | 9/2014 | Regan |
| 8,918,938 B2 | 12/2014 | Osiol |
| 8,963,740 B2 | 2/2015 | Koukoumidis |
| 8,974,734 B2 | 3/2015 | Tian |
| 8,998,652 B2 | 4/2015 | Martineau |
| 9,212,933 B2 | 12/2015 | Jetcheva |
| 2001/0007176 A1 | 7/2001 | Attilieni |
| 2001/0047246 A1 | 11/2001 | Fullen |
| 2002/0195220 A1 | 12/2002 | Jacobson |
| 2004/0225200 A1 | 11/2004 | Edmundson |
| 2005/0035477 A1 | 2/2005 | Jacobson |
| 2007/0118328 A1 | 5/2007 | Vock |
| 2007/0152379 A1 | 7/2007 | Jacobson |
| 2007/0187855 A1 | 8/2007 | Jacobson |
| 2008/0005933 A1 | 1/2008 | Auger |
| 2008/0275729 A1 | 11/2008 | Taggart |
| 2009/0241376 A1 | 10/2009 | Robson |
| 2011/0138652 A1 | 6/2011 | Lucas |

(Continued)

FOREIGN PATENT DOCUMENTS

| | | |
|---|---|---|
| EP | 1847193 | 10/2007 |
| WO | WO/2015/073062 | 5/2015 |

*Primary Examiner* — Reza Aghevli
(74) *Attorney, Agent, or Firm* — Tran & Associates

(57) ABSTRACT

An Internet of Thing (IoT) device for a city includes a light source; sensors including a camera and a microphone array; a processor coupled to the light source and the sensor; and a wireless transceiver coupled to the processor.

18 Claims, 8 Drawing Sheets

(56) References Cited

U.S. PATENT DOCUMENTS

| | | |
|---|---|---|
| 2012/0120243 A1* | 5/2012 | Chien .................... F21S 4/28 |
| | | 348/159 |
| 2012/0123667 A1 | 5/2012 | Guéziec |
| 2012/0269494 A1 | 10/2012 | Satyanarayana |
| 2013/0250115 A1* | 9/2013 | Fan ................... G06K 9/00771 |
| | | 348/150 |
| 2014/0206481 A1 | 7/2014 | Zuger |
| 2014/0316711 A1 | 10/2014 | Everson |
| 2015/0035437 A1* | 2/2015 | Panopoulos ............ F21V 14/02 |
| | | 315/112 |
| 2015/0201694 A1 | 7/2015 | Boyce |
| 2015/0228043 A1 | 8/2015 | Ryan |
| 2015/0271375 A1* | 9/2015 | Chien ................. F21V 33/0052 |
| | | 348/159 |
| 2015/0279366 A1 | 10/2015 | Krestnikov |
| 2015/0283450 A1 | 10/2015 | Mcroberts |
| 2015/0319829 A1 | 11/2015 | Shu |
| 2015/0373482 A1* | 12/2015 | Barnard ............ H05B 37/0272 |
| | | 370/338 |
| 2016/0027262 A1* | 1/2016 | Skotty ............... H05B 37/0227 |
| | | 340/541 |
| 2016/0055422 A1 | 2/2016 | Li |
| 2016/0098860 A1 | 4/2016 | Basra |
| 2016/0100086 A1* | 4/2016 | Chien .................. H04N 5/2256 |
| | | 348/143 |
| 2016/0173746 A1* | 6/2016 | Chien .................... F21S 8/035 |
| | | 348/159 |

* cited by examiner

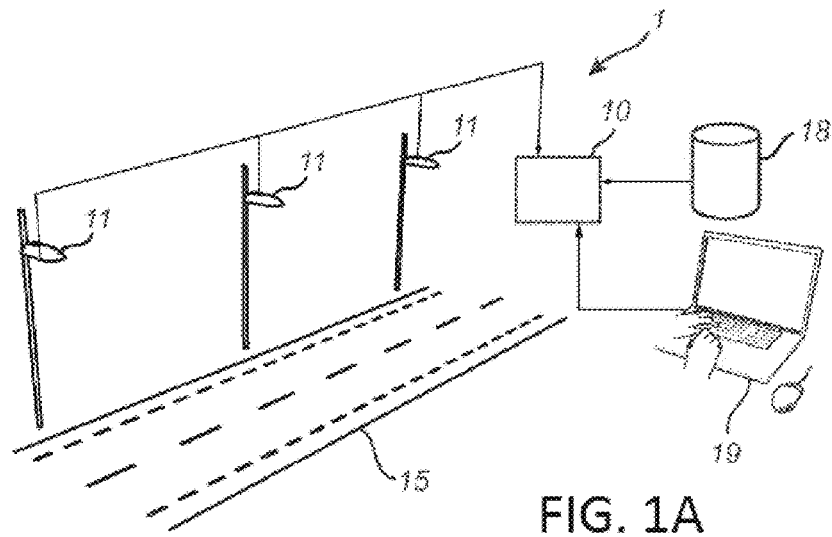
FIG. 1A
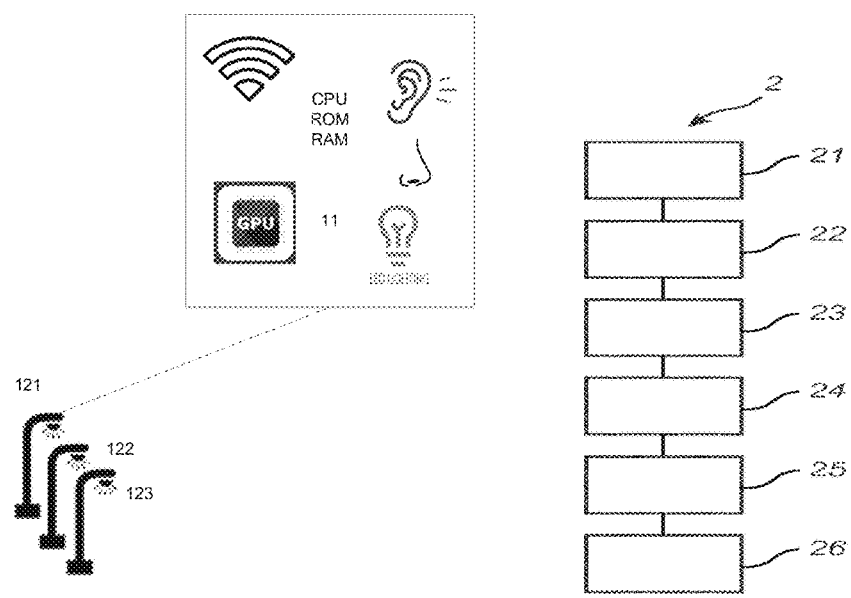
FIG. 1B
FIG. 1C

SMART LIGHTING AND CITY SENSOR

BACKGROUND

The present invention relates to the Internet of Things (IoT).

Street devices, such as road lamps and traffic enforcements cameras, in town districts (or local districts) are normally high in number and spread over rather large geographical areas, which makes maintenance and planning with respect to the street devices complicated and costly. Further, as a purpose of such street devices normally is to increase safety for drivers and pedestrians, travelling in areas absent of properly working street devices may increase the risk of accidents, which is undesirable.

SUMMARY

In one aspect, an Internet of Thing (IoT) device for a city includes a light source; sensors including a camera and a microphone array; a processor coupled to the light source and the sensor; and a wireless transceiver coupled to the processor.

In another aspect, an Internet of Thing (IoT) device includes a head portion; an elongated stress sensor coupled to the head portion, the stress sensor coupled to a surface; a processor coupled to the stress sensor; and a wireless transceiver coupled to the processor.

These and other features of the present invention will become readily apparent upon further review of the following specification and drawings.

BRIEF DESCRIPTION OF THE DRAWINGS

FIG. 1A is a perspective view of an exemplary smart city block with IoT sensors.

FIG. 1B is an exemplary block diagram a smart city device according to the present invention.

FIG. 1C is an exemplary process for the system of FIGS. 1A-1B.

Similar reference characters denote corresponding features consistently throughout the attached drawings.

DETAILED DESCRIPTION OF THE PREFERRED EMBODIMENTS

Figure 2A:
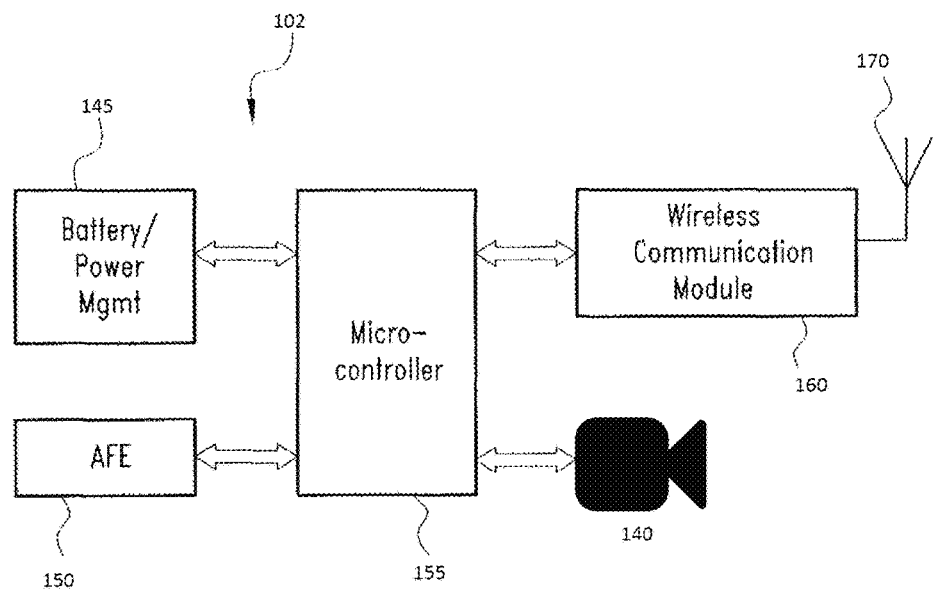
FIG. 2A is a block diagram of an electronic circuit for a smart device.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

In one embodiment, a smart device includes sensor(s) and wireless communication therein. The device can detect tension and communicate to a computer for storage and analysis. The smart device provides an automatic electronic process that eliminates the need for a manual inspection process, and uses electronic detection of stress, eliminating subjective human judgments and producing greater uniformity in maintenance, inspection, and emergency detection procedures.

FIG. 1A shows a system 1 with a computing unit 10 in communication with monitoring units, each monitoring unit arranged to monitor an operational status of at least one street device 11. Hence, a single monitoring unit may be configured to monitor one or several lighting devices 11 with respect to operational status. The monitoring units may e.g. be mounted in (or at or in the vicinity of) the street devices 11. In the present example, the street devices 11 are road lamps arranged to illuminate a road 15 but may alternatively be any other kind of street devices, such as traffic enforcements cameras or traffic lights. The computing unit 10 may be in communication with a user interface 19 and a database 18 (or memory or any other means) for storing region description data. The region description data may e.g. be a region map (such as a road map or geographical map) and/or data indicative of industrial areas, parks, museums parking lots, average number of people in the region or any other information which may be utilized to prioritize regions e.g. with respect to maintenance urgency. The region description data may be presented e.g. in a map and/or a table over a region in which the street devices 11 are located.

Each monitoring unit may be configured to continuously and/or at predetermined time intervals and/or upon request (e.g. from the computing unit 10) measure (or check) the operational status of the street device 11. The operational status may e.g. be indicated by parameters such as light output, energy consumption or any other parameter relating to the operational condition of the street device 11. Further, the operational status of the street device 11 may be indicated by a failure signal. The monitoring units may be configured to automatically transmit the failure indication signal in case the street device is (or is soon) out of function.

Further, the monitoring units may be configured to store or measure the geographical positions of the street devices 11. For example, a monitoring unit (or the street devices) may comprise a GPS receiver for obtaining a GPS position of the street device 11.

The monitoring units may communicate (directly or indirectly) with the computing unit 10, preferably in an automatic manner. For example, the monitoring units may communicate with the computing unit 10 by means of radio (or any wireless) communication and/or wired communication such as electrical/optical communication (e.g. via Ethernet). The monitoring units may communicate via other units (e.g. servers), which in turn communicates with the computing unit. Hence, the computing unit 10 may obtain information indicative of the operational statuses and positions of the street devices 11 from a peripheral server, which has gathered such information e.g. from the monitoring units.

FIG. 1B shows a block diagram of the unit 11. While the unit can include conventional yellow sodium vapor lights, white light emitting diode (LED) light is preferred with an adaptive control system to provide energy efficient lighting. Smart LED streetlights enable the city to monitor energy consumption and provide the opportunity to dim lighting levels during late evenings. Other benefits of smart LED streetlights include:

Reducing street light energy costs by 40% to 60%

Improving lighting quality and visibility and enhance street safety

Ongoing maintenance savings by extending maintenance cycle for bulb replacement

Real-time reporting of energy usage for energy billing and communicating non-operating streetlights for improved response Eliminating the use of hazardous materials contained in sodium vapor lamps Preserving the night sky in late evenings The unit 11 includes an electronic nose to detect air pollution level. The electronic nose can simply be a MEMS device acting as a particle counter. Alternatively, the electronic nose can detect composition of gas and provide a more detailed report, for example identifying air pollution as gun power smell, illegal drug substance smell, car exhaust smell, industrial pollutant, or rotting mammal smell and such information can be relayed to suitable trash removal contractors. The unit 11 also includes a microphone array that can detect sound and direction of sound. This is useful to detecting gunshots, and the direction of the sound can be triangulated to pinpoint the position of the shooting. The unit 11 also includes a camera, which can be a 360 degree camera. Alternatively, the camera can be a 3D camera such as the Kinect camera or the Intel RealSense camera for ease of generating 3D models and for detecting distance of objects. To reduce image processing load, each camera has a high performance GPU to perform local processing, and the processed images, sound, and odor data are uploaded to a cloud storage for subsequent analysis.

An embodiment of the electronic nose can be used that includes a fan module, a gas molecule sensor module, a control unit and an output unit. The fan module is used to pump air actively to the gas molecule sensor module. The gas molecule sensor module detects the air pumped into by the fan module. The gas molecule sensor module at least includes a gas molecule sensor which is covered with a compound. The compound is used to combine preset gas molecules. The control unit controls the fan module to suck air into the electronic nose device. Then the fan module transmits an air current to the gas molecule sensor module to generate a detected data. The output unit calculates the detected data to generate a calculation result and outputs an indicating signal to an operator or compatible host computer according to the calculation result.

One embodiment of an air pollution detector measures five components of the Environmental Protection Agency's Air Quality Index: ozone, particulate matter, carbon monoxide, sulfur dioxide, and nitrous oxide. This device detects all of these pollutants except sulfur dioxide. The device also includes a town gas sensor to alert the user to gas leaks or the presence of flammable gases. Furthermore, a temperature and humidity sensor is included as these conditions can impact the performance of the gas sensors. The system can also use Shinyei PPD42 Particulate Matter Detector, MQ-2 Gas Sensor, MQ-9 Gas Sensor, MiCS-2714 Gas Sensor (NO2), MiSC-2614 Gas Sensor (Ozone) and Keyes DHT11 Temperature and Humidity Sensor to detect air pollution.

City pollution may also impact cloud formation and rainfall. "Water vapor doesn't ordinarily spontaneously condense into drops to form clouds," says climate scientist Tom Bell, from NASA Goddard Space Flight Center. "It needs dirt to form around. All rain needs aerosols to form." In the natural world, cloud-forming aerosols are things like sea salt, dust, and pollen, all of which are large particles. But pollution aerosols are usually smaller and more numerous than natural aerosols. With lots of particles to collect on, water coalesces into many tiny droplets instead of larger rain-sized drops. The impact on rain, says Bell, varies depending on where the clouds form. In some cases, urban aerosols suppress rain, but in others they increase it. An electronic tongue sensor can be provided to sense quality of fog, rain and/or water. The tongue includes a stirring module, a liquid molecule sensor module, a control unit and an output unit. The stirring module is used to pump liquid actively to the liquid molecule sensor module. The molecule sensor module detects the liquid molecules pumped into by the stirring module. The liquid molecule sensor module at least includes a molecule sensor which is covered with a compound. The compound is used to combine preset liquid molecules. The control unit controls the stirring module to pump liquid to be "tasted" into the electronic tongue device. Then the module transmits a flow current to the liquid molecule sensor module to generate a detected data. The output unit calculates the detected data to generate a calculation result and outputs an indicating signal to an operator or compatible host computer according to the calculation result. Such electronic tongue can detect quality of fog or liquid, among others.

FIG. 1C schematically shows a method 2 which may be implemented by the computing unit 10 shown in FIG. 1. For example, the method 2 may be a computer implemented method. A computer program may be provided for executing the method 2. The method 2 comprises obtaining data indicative of the operational status of each street device 11. In the present embodiment, the data is received 21 from the street devices 11 (or the monitoring units connected to, and optionally comprised in, the street devices 11). The data is transmitted (preferably automatically) from the monitoring units (or any unit which has received the data from the monitoring units) to the computing unit 10. The data may e.g. be air quality, traffic flow, parking availability, gunshot sound, verbal altercation, sound pollution, light level. The data may also be indicative of a future operational condition of a street device estimated (e.g. by the monitoring unit) based on the current operational status of the street device 11. Further, the data from the street devices 11 is indicative of the position of each street device 11. The street device 11 may for e.g. send its GPS position. The method 2 further comprises obtaining 22 region description data for the region in which the street devices 11 are located. The region description data may be transmitted (or retrieved) from the database 18. The region description data may be a (geographic) map (such as a road map) over the region in which the street devices 11 are located. For example, the geographic data may be retrieved from the Internet from an on-line map provider. The geographic data may provide information such as road type (e.g. straight or curved road, roundabout and bridge). The method 2 further comprises correlating 23 the geographic positions and operational statuses of the street devices 11 with the region description data. For example, the correlation may be provided as a map, table or any other storage/display format pointing out where (at least some of) the street devices 11 are located and indicating their operational status. In the present embodiment, the method 2 may further comprise estimating traffic, noise, air pollution, lighting conditions at roads and/or in subareas in the region in which the street devices 11 are located based on the region description data and the data received from the street devices 11. A graphics processor coupled to the processor to process video to detect traffic flow, parked car, open parking spot, license plate number, vehicle identification, and face identification. An energy scavenger coupled to the processor to supply power. A vehicular radio transceiver to communicate with a smart car. The IoT can be inside an enclosure mounted to a light pole, a traffic light, a government vehicle, a utility vehicle, or a city vehicle. A cloud based image processing system to receive images from the camera and recognize an image.

The IoT device can run code to minimize light pollution by lighting only with a moving person or vehicle in proximity to the light source. This is done by detecting motion near each light pole, and turning on only a few lights in the area of motion while keeping the other lights off. This approach has the advantage of shining light on those who hide in the darkness for nefarious purposes. The IoT device can run code to detect water pipe rupture by recognizing the position of a fire hydrant and when water motion is detected at the hydrant, the IoT device can run code to report a fire or emergency to a fire department. The IoT device can run code to gate off traffic to the fire or emergency. The IoT device can run code to detect car accident and request assistance from police or ambulance by detecting car collisions or detecting unusual prolonged traffic at a spot. The IoT device can run code to detect crime using a combination of video and sound. The IoT device can run code to discover anomalies with a particular city block. The IoT device can run code for providing sensor data to a crowd and requesting from the crowd as a game one or more reasons explaining sensor data, as detailed in FIG. 8.

The IoT device can run code to detect sound direction of sound such as gunshot or gang fight or a crime in progress. Because each light pole is sequential, the microphone arrays have high resolution and a combination of microphone data from an array of light poles on both sides of a street or freeway provides valuable information in detecting sources of sound, much like SONAR systems. In some embodiments, the sound source may be a natural or an artificial sound generator. Examples of natural sounds include, without limitation, human sounds, animal sounds, environmental sounds, etc. In this instance, a natural sound generator may be a human being, an animal, the environment, etc. An example of an artificial sound is a recorded sound, and an artificial sound generator may be a speaker. The sound wave generated from the sound source and propagated toward the sound direction detecting module may have a specific frequency and a certain volume. Further, the sound source may generate sound that has distinguishable characteristics (longitudinal or transverse waves) and physical properties. The characteristics and properties of a sound wave may also be closely related to the transmission medium through which the sound wave travels. Further, the generated sound may be ultrasound that has a frequency greater than the frequency that may be detected by a human, or infrasound that has a frequency lower than the frequency that may be detected by a human. In some embodiments, the sound sensors 121, 122 and 123 may measure the physical characteristics of the detected sound wave and convert the physical characteristics into analog or digital signals. The sound sensors 121, 122 and 123 may detect the vibration and/or the pressure of the sound wave traveling through the sound sensors. The microphone arrays or sound sensors 121, 122 and/or 123 of the sound direction detecting module may detect the sound wave generated by the sound source. In some embodiments, the sound sensors 121 and 122 are installed on one side of the sound direction detecting module and at their respective physical locations. The sound sensor 123 may be positioned at a physical location different from the sound sensors 121 and 122. For example, the sound sensor 123 may be installed on the opposite side of the sound direction detecting module. Thus, the sound sensors 121 and 122 may be positioned to face in a first direction. The sound sensor 123 may be positioned to face in a second direction, which differs from the first direction that the sound sensors 121 and 122 face in. In some embodiments, because the sound direction detecting module may detect the sound wave propagated from the sound source in any angle, a distance 111 between the sound sensor 121 and the sound source may be different from a distance 112 between the sound sensor 122 and the sound source. Since the intensity of sound decreases as the distance of propagation increases, the sound pressure detected by the sound sensor 121 is likely to be different from the pressure detected by the sound sensor 122. On the other hand, if the sound pressures detected by the two sound sensors 121 and 122 are substantially identical (same), then the distance 111 and the distance 112 may substantially be the same. In such a situation, the direction vector of the sound source may be close to 90 degrees. If the sound wave is not reflected, for example, from some surface, the sound pressures detected from the different sound sensors may be used to show a direction of the sound source relative to the sound direction detecting module. According to some embodiments of the present disclosure, the sound sensors 121 and 122 of the sound direction detecting module may detect the sound wave propagated from an alternative sound source 140, which is different from the sound source. The sound sensor 121 may have substantially the same distance to the sound source as to the sound source 140, and the sound sensor 122 may have substantially the same distance to the sound source as to the sound source 140. Stated differently, the sound sensor 121 may be positioned or located substantially the same distance from the sound source as from the sound source 140, and the sound sensor 122 may be positioned or located substantially the same distance from the sound source as from the sound source 140. In this case, the sound direction detecting module may have difficulty determining whether the direction of the sound wave is from the sound source or the sound source 140 if it utilizes the sound pressures detected by the sound sensors 121 and 122 to determine the direction of the sound wave. Thus, in a two-dimensional space, two sound sensors may be used to determine a direction vector with approximately 180-degree accuracy. That is, the sound direction detecting module may accurately describe, in angle degrees, whether a sound source is from the left side of, the right side of, or the middle area between the sound sensors 121 and 122 in a 180-degree range. However, the sound direction detecting module may not be able to determine whether the sound source is in-front-of or behind the sound sensors 121 and 122. According to some embodiments of the present disclosure, a third sound sensor 123 may be installed in the sound direction detecting module at a fixed position and on a side of the sound direction detecting module that is different from the side of the sound direction detecting module that the sound sensors 121 and 122 are located on. The sound pressure detected by the third sound sensor 123 may then be used to compare with the pressures detected by the sound sensors 121 and 122 in order to determine whether the sound source is in-front-of or behind the sound sensors 121 and 122. For example, in FIG. 1, the sound sensor 123 may be placed at a position in between the positions of the sound sensors 121 and 122. At the same time, the sound sensor 123 may be placed on a side of the sound direction detecting module that is opposite to the side of the sound direction detecting module on which the sound sensors 121 and 122 are placed. During operation, the distance between the sound source and the sound sensor 123 is different from the distance 111 and distance 112. Thus, if the sound pressure detected by the sound sensor 123 is weaker than the pressures detected by the sound sensors 121 and/or 122, it may be reasoned that the sound wave should be from the sound source, which is in front of the sound sensors 121 and 122 and has a shorter distance to the sound sensors 121 and 122 than to the sound sensor 123. Similarly, when the sound pressure detected by the sound sensor 123 is stronger than the pressures detected by the sound sensors 121 and/or 122, the sound direction detecting module may determine that the distance from the sound source to the sound sensor 123 is shorter than to the sound sensors 121 and 122. In this case, the sound should be originated from the sound source 140, which is behind the sound sensors 121 and 122. Thus, by using three acoustic sound sensors 121, 122 and 123, the sound direction detecting module may divide a two-dimensional plane, into four substantially same-sized quadrants (front left, front right, behind left, and behind right) from the perspective of the sound direction detecting module, and may determine a two-dimensional direction vector in a 360-degree range. In a similar approach, the IoT device can run code to detect air pollution or odor from the electronic nose. The IoT device can run code to detect crime using a combination of video, odor and sound.

Gunshot detectors based on video, sound and other IoT sensors help cops guess at the extent of unreported gun crime. With location data, police officers don't have to spend as much time searching for evidence that a shooting has occurred, such as spent shell casings. The software can tell whether multiple guns were used, or whether the shooter was moving as he pulled the trigger.

As shown in FIG. 2A, a microcontroller 155 receives and processes signals from the sensor 112-114, and converts those signals into an appropriate digital electronic format. The microcontroller 155 wirelessly transmits tension information in the appropriate digital electronic format, which may be encoded or encrypted for secure communications, corresponding to the sensed traffic and/or crime indication through a wireless communication module or transceiver 160 and antenna 170. Optionally, a camera 140 can be provided to visually detect traffic and/or crime and movement of the structure. While monitoring of the smart device 100 traffic and/or crime is continuous, transmission of tension information can be continuous, periodic or event-driven, such as when the tension enters into a warning or emergency level. Typically the indicated tension enters a warning level, then an emergency level as tension drops below the optimal range, but corresponding warning and emergency levels above the optimal range can also be used if supported by the smart device 100. The microcontroller 155 is programmed with the appropriate warning and emergency levels, as well as internal damage diagnostics and self-recovery features.

The tension information can take any form, including a simple warning/emergency indication that the tension is approaching or exceeding tension specifications, respectively. While under-tension is known to be the primary cause of structural or mechanical problems associated with devices, over-tension can also be a problem and can also be reported by the smart device 100.

The sensors can detect force, load, tension and compression forces on the device such as the device. Other data includes Acceleration; Velocity; Global absolute displacement; Local relative displacement; Rotation; Strain; Stress; Force; and Static-position video. Wind speed/direction; External temperature; weather parameters (rainfall, humidity, solar radiation, etc.); Internal or structural temperature; Mass loading (occupant count, etc.); Static tilt; Fatigue damage; Corrosion; Acoustic emission; and Moving-position video. A force is simply a push or pull to an object and can be detected by a load cell, pressure cell or strain sensor. A Load: Is simply a force applied to a structure. Ex: weight of vehicles or pedestrians, weight of wind pushing on sides. Tension & Compression are internal forces that make a member longer or shorter. Tension stretches a member and Compression pushes the member closer together. Acceleration can also be detected by Force-Balance (Servo) Piezoelectric Piezoresistive MEMS. Velocity can be measured by force-balance (servo) MEMS, or Mechanical Doppler Heated wire. A local Displacement sensor can be LVDT/ Cable potentiometer Acoustic Optical/laser Temperature Electrical Optical fiber. A rotation sensor can be Gyro MEMS Gyro Tilt Electro-mechanical MEMS. A strain sensor can be a resistance gauge Vibrating wire Optical fiber Corrosion Electrical Chemical sensors. A traffic and/or crime sensor can be a microphone listening to acoustic emission, or Piezoelectric MEMS, for example, and sonar sound processing can be used to detect where crime activity is coming from.

The sensor 112-114, transceiver 160/antenna 170, and microcontroller 155 are powered by and suitable power source, which may optionally include an electromagnetic field (EMF) scavenging device 145, such as those known in the art, that convert ambient EMF (such as that emitted by radio station broadcasts) into small amounts of electrical power. The EMF scavenging device 145 includes a battery to buffer and store energy for the microcontroller 155, sensor 112-114, camera 140 and wireless communications 160/170, among others.

The circuit of FIG. 2A contains an analog front-end ("AFE") transducer 150 for interfacing signals from the sensor 112-114 to the microcontroller 155. The AFE 150 electrically conditions the signals coming from the sensor 112-114 prior to their conversion by the microcontroller 155 so that the signals are electrically compatible with the specified input ranges of the microcontroller 155. The microcontroller 155 can have a CPU, memory and peripheral circuitry. The microcontroller 155 is electrically coupled to a wireless communication module 160 using either a standard or proprietary communication standard. Alternatively, the microcontroller 155 can include internally any or all circuitry of the smart device 100, including the wireless communication module 160. The microcontroller 155 preferably includes power savings or power management circuitry 145 and modes to reduce power consumption significantly when the microcontroller 155 is not active or is less active. The microcontroller 155 may contain at least one Analog-to-Digital Converter (ADC) channel for interfacing to the AFE 150.

The battery/power management module 145 preferably includes the electromagnetic field (EMF) scavenging device, but can alternatively run off of previously stored electrical power from the battery alone. The battery/power management module 145 powers all the circuitry in the smart device 100, including the camera 140, AFE 150, microcontroller 155, wireless communication module 160, and antenna 170. Even though the smart device 100 is preferably powered by continuously harvesting RF energy, it is beneficial to minimize power consumption. To minimize power consumption, the various tasks performed by the circuit should be repeated no more often than necessary under the circumstances.

Stress information from the smart device 100 and other information from the microcontroller 155 is preferably transmitted wirelessly through a wireless communication module 160 and antenna 170. As stated above, the wireless communication component can use standard or proprietary communication protocols. Smart lids 100 can also communicate with each other to relay information about the current status of the structure or machine and the smart device 100 themselves. In each smart device 100, the transmission of this information may be scheduled to be transmitted periodically. The smart lid 100 has a data storage medium (memory) to store data and internal status information, such as power levels, while the communication component is in an OFF state between transmission periods. On the other hand, once the communication commences in the ON state, the microcontroller 155 can execute the following tasks:

1. Neighbor discovery: in this task each smart device 100 sends a beacon identifying its location, capabilities (e.g. residual energy), status. 2. Cluster formation: cluster head will be elected based on the findings in (1). The cluster children communicate directly with their cluster head (CH). 3. Route discovery: this task interconnects the elected cluster heads together and finds the route towards the sink smart device (node) so that minimum energy is consumed. 4. Data transmission: the microcontroller processes the collected color data and based on the adopted data dissemination approach, the smart device 100 will do one of the following.

(a) Transmit the data as is without considering the previous status; or (b) transmit the data considering the previous status. Here we can have several scenarios, which include: (i) transmitting the data if the change in reported tension exceeds the warning or emergency levels; and (ii) otherwise, do not transmit.

Figure 2B:
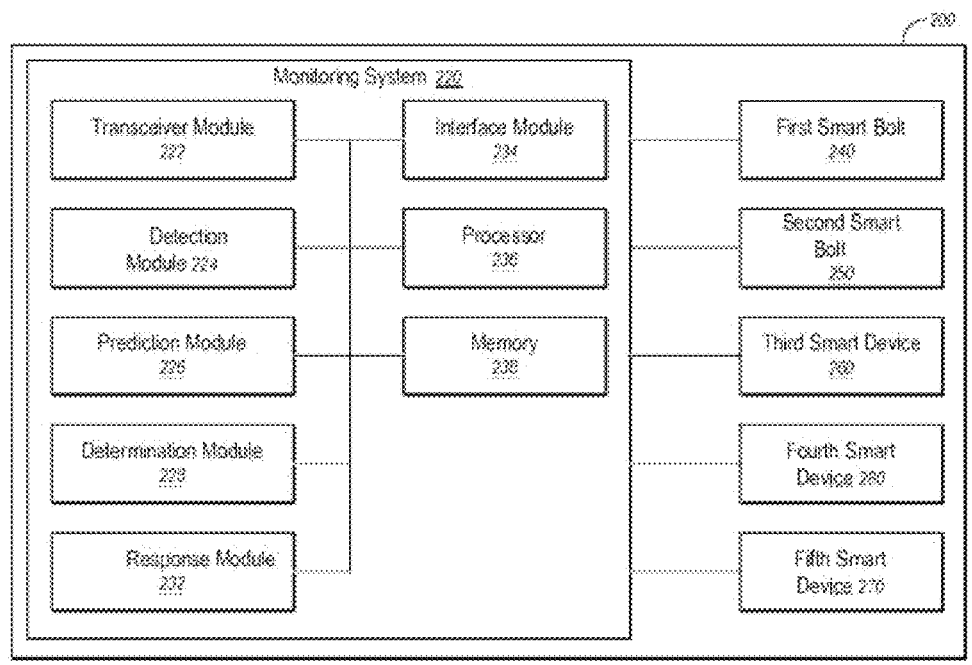
FIG. 2B is a block diagram of a big data system for predicting traffic and/or light maintenance, for example.

The device electronic of FIG. 2A operates with a big data discovery system of FIG. 2B that determines events that may lead to failure. FIG. 2B is a block diagram of an example stress monitoring system 200 that may be process the stress detected by the smart device 100 of FIG. 1, arranged in accordance with at least some embodiments described herein. Along with the stress monitoring system 220, a first smart device such as a smart device 240, a second smart device 250, a third smart device 260, a fourth smart device 280, and additional sensors 270 may also be associated with the unit 200. The stress monitoring system 220 may include, but is not limited to, a transceiver module 222, a stress detection module 224, a stress prediction module 226, a determination module 228, a stress response module 232, an interface module 234, a processor 236, and a memory 238. The smart bolt is commonly owned with Ser. No. 15/144, 814 filed May 2, 2016, the content of which is incorporated by reference.

The transceiver module 222 may be configured to receive a stress report from each of the first, second, and third smart devices 240, 18, 260. In some embodiments, the transceiver module 222 may be configured to receive the stress reports over a wireless network. For example, the transceiver module 222 and the first, second, and third smart devices 240, 18, 260 may be connected over a wireless network using the IEEE 802.11 or IEEE 802.15 standards, for example, among potentially other standards. Alternately or additionally, the transceiver module 222 and the first, second, and third smart devices 240, 18, 260 may communicate by sending communications over conductors used to carry electricity to the first, second, and third smart devices 240, 18, 260 and to other electrical devices in the unit 200. The transceiver module 222 may send the stress reports from the first, second, and third smart devices 240, 18, 260 to the prediction module 226, the stress detection module 224, and/or the determination module 228.

The stress module 224 may be configured to detect stress as detected by the devices 100. The signal sent by the devices 100 collectively may indicate the amount of stress being generated and/or a prediction of the amount of stress that will be generated. The stress detection module 224 may further be configured to detect a change in stress of non-smart devices associated with the unit 200.

The prediction module 226 may be configured to predict future stress based on past stress history as detected, environmental conditions, forecasted stress loads, among other factors. In some embodiments, the prediction module 226 may predict future stress by building models of usage and weight being transported. For example, the prediction module 226 may build models using machine learning based on support vector machines, artificial neural networks, or using other types of machine learning. For example, stress may correlate with the load carried by a bridge or an airplane structure. In other example, stress may correlate with temperature cycling when a structure is exposed to constant changes (such as that of an airplane).

The prediction module 226 may gather data for building the model to predict stress from multiple sources. Some of these sources may include, the first, second, and third smart devices 240, 18, 260; the stress detection module 224; networks, such as the World Wide Web; the interface module 234; among other sources. For example, the first, second, and third smart devices 240, 18, 260 may send information regarding human interactions with the first, second, and third smart devices 240, 18, 260. The human interactions with the first, second, and third smart devices 240, 18, 260 may indicate a pattern of usage for the first, second, and third smart devices 240, 18, 260 and/or other human behavior with respect to stress in the unit 200.

In some embodiments, the first, second, and third smart devices 240, 18, 260 may perform predictions for their own stress based on history and send their predicted stress in reports to the transceiver module 222. The prediction module 226 may use the stress reports along with the data of human interactions to predict stress for the system 200. Alternately or additionally, the prediction module 226 may make predictions of stress for the first, second, and third smart devices 240, 18, 260 based on data of human interactions and passed to the transceiver module 222 from the first, second, and third smart devices 240, 18, 260. A discussion of predicting stress for the first, second, and third smart devices 240, 18, 260 is provided below with respect to FIGS. 5 and 6.

The prediction module 224 may predict the stress for different amounts of time. For example, the prediction module 224 may predict stress of the system 200 for 1 hour, 2 hours, 12 hours, 1 day, or some other period. The prediction module 224 may also update a prediction at a set interval or when new data is available that changes the prediction. The prediction module 224 may send the predicted stress of the system 200 to the determination module 228. In some embodiments, the predicted stress of the system 200 may contain the entire stress of the system 200 and may incorporate or be based on stress reports from the first, second, and third smart devices 240, 18, 260. In other embodiments, the predicted stress of the system 200 may not incorporate or be based on the stress reports from the first, second, and third smart devices 240, 18, 260.

The determination module 228 may be configured to generate a unit stress report for the system 200. The determination module 228 may use the current stress of the system 200, the predicted stress of the system 200 received from the prediction module 224; stress reports from the first, second, and/or third smart devices 240, 18, 260, whether incorporated in the predicted stress of the system 200 or separate from the predicted stress of the system 200; and an amount of stress generated or the predicted amount of stress, to generate a unit stress report.

In some embodiments, one or more of the stress reports from the first, second, and/or third smart device 240, 18, 260 may contain an indication of the current operational profile and not stress. In these and other embodiments, the determination module 228 may be configured to determine the stress of a smart device for which the stress report indicates the current operational profile but not the stress. The determination module 228 may include the determined amount of stress for the smart device in the unit stress report. For example, both the first and second smart device 240, 18 may send stress report. The stress report from the first smart device 240 may indicate stress of the first smart device 240. The stress report from the second smart device 18 may indicate the current operational profile but not the stress of the second smart device 18. Based on the current operational profile of the second smart device 18, the determination module 228 may calculate the stress of the second smart device 18. The determination module 228 may then generate a unit stress report that contains the stress of both the first and second smart devices 240, 18.

In some embodiments, the stress monitoring system 220 may not include the prediction module 226. In these and other embodiments, the determination module 228 may use stress reports from the first, second, and/or third smart devices 240, 18, 260, with the received amount of stress inferred on non-smart devices, if any, to generate the unit stress report. The determination module 228 may send the unit stress report to the transceiver module 222.

In some embodiments, the processor 236 may be configured to execute computer instructions that cause the stress monitoring system 220 to perform the functions and operations described herein. The computer instructions may be loaded into the memory 238 for execution by the processor 236 and/or data generated, received, or operated on during performance of the functions and operations described herein may be at least temporarily stored in the memory 238.

Although the stress monitoring system 220 illustrates various discrete components, such as the prediction module 226 and the determination module 228, various components may be divided into additional components, combined into fewer components, or eliminated, depending on the desired implementation. In some embodiments, the unit 200 may be associated with more or less smart devices than the three smart devices 240, 18, 260 illustrated in FIG. 2.

Figure 3:
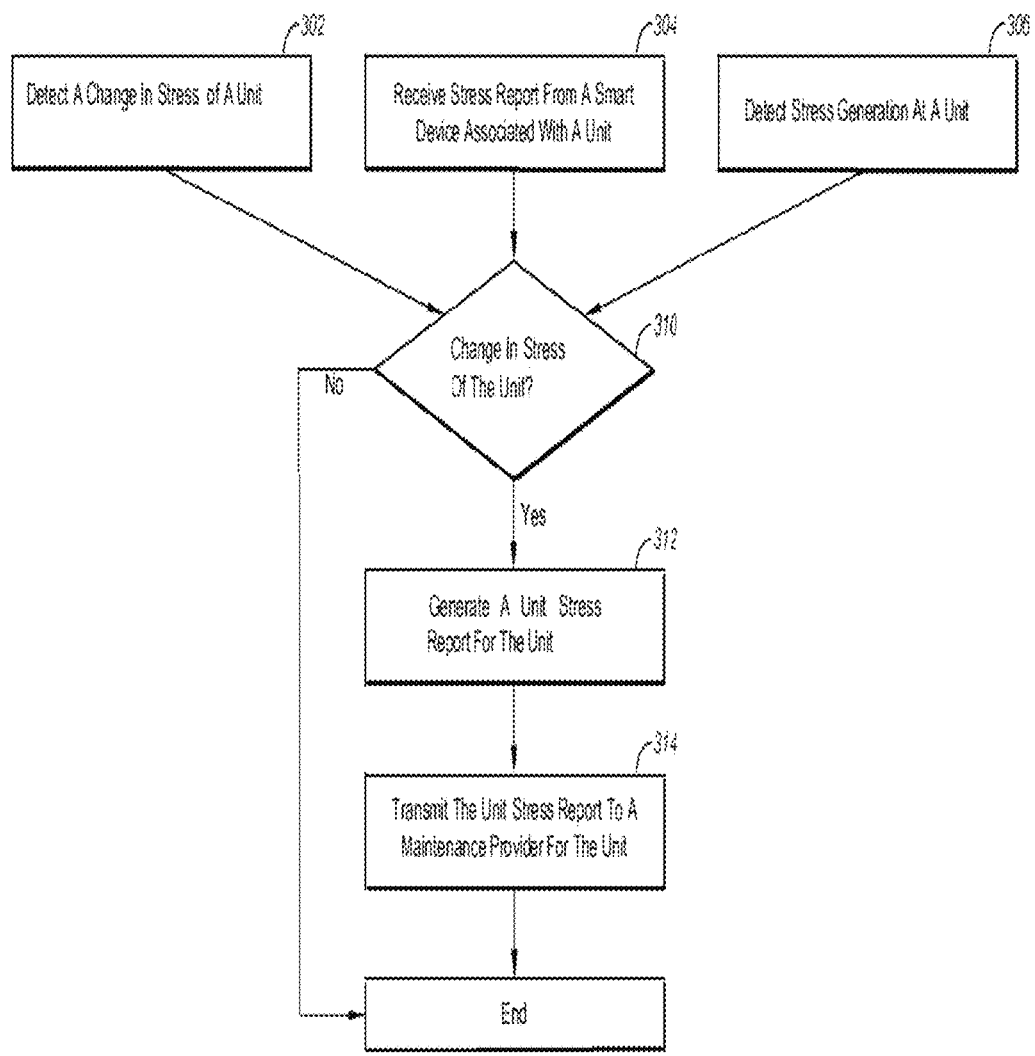
FIG. 3 is a flowchart illustrating one operation of the system of FIG. 2A-2B in detecting traffic under a light.

FIG. 3 is a flow chart of an example method 300 of monitoring stress of a unit, arranged in accordance with at least some embodiments described herein. The method 300 may be implemented, in some embodiments, by an stress monitoring system, such as the stress monitoring system 220 of FIG. 2. For instance, the processor 236 of FIG. 2B may be configured to execute computer instructions to perform operations for monitoring stress as represented by one or more of blocks 302, 304, 306, 310, 312, and/or 314 of the method 300. Although illustrated as discrete blocks, various blocks may be divided into additional blocks, combined into fewer blocks, or eliminated, depending on the desired implementation.

The method 300 may begin at one or more of blocks 302, 304, and/or 306. The blocks 302, 304, and/or 306 may occur at the same time or at different times and may or may not depend on one another. Furthermore, one or more of the block 302, 304, 306 may occur during the method 300. For example, the method 300 may complete when blocks 304, 310, and 312 occurs and without the occurrence of block 302 and 306.

In block 302, a change in stress of a device (device or beam) associated with a unit may be detected. A non-smart device may by any device that receives stress and does not generate an stress report indicating its stress. A change in the stress of a non-smart device may be detected using an stress detection module and/or usage meter associated with the unit, such as the stress detection module 224 and/or the smart device 100. For example, non-smart device stress can be estimated by the load the unit carries, the temperature cycling experienced by the unit, for example.

After a change in stress of the non-smart device is detected, the method 300 proceeds to block 310. In block 304, an stress report from a smart device such as the smart device 100 associated with the unit may be received. A smart device may be a device that detects stress and generates and transmits an stress report indicating the stress on the smart device. The stress report may indicate predicted future stress of the smart device. In some embodiments, an stress report may be received at set intervals from the smart device regardless of a change in the stress report. Alternately or additionally, a stress report may be received after a change in the stress of the smart device results in a change to the stress report. After a stress report is received from the smart device, the method 300 proceeds to block 310.

In block 306, stress experienced at the unit may be detected. Stress at the unit may be detected using a stress detection module, such as the stress detection module 224 of FIG. 2B. After detecting stress at the unit, the method proceeds to block 310. At block 310, it is determined if a change in the stress occurred. For example, if an increase in stress occurs at the same time and at the same amount as an increase in the stress of a non-smart device, a change in the stress may not occur. If a change in the stress occurs, the method 300 proceeds to block 312. If no change occurs, the method 300 ends.

At block 312, a unit stress report is generated for the unit. In some embodiments, the unit stress report may indicate the current stress of the unit. Alternately or additionally, the unit stress report may indicate a current and predicted future stress of the unit. At block 314, the unit stress report is transmitted to a maintenance provider. In some embodiments, the unit stress report may be transmitted when the unit stress report indicates a change in stress for the unit that is greater than a predetermined threshold. If the unit stress report indicates a change in stress for the unit that is less than the predetermined threshold, the unit stress report may not be transmitted to the provider of maintenance services.

Figure 4A:
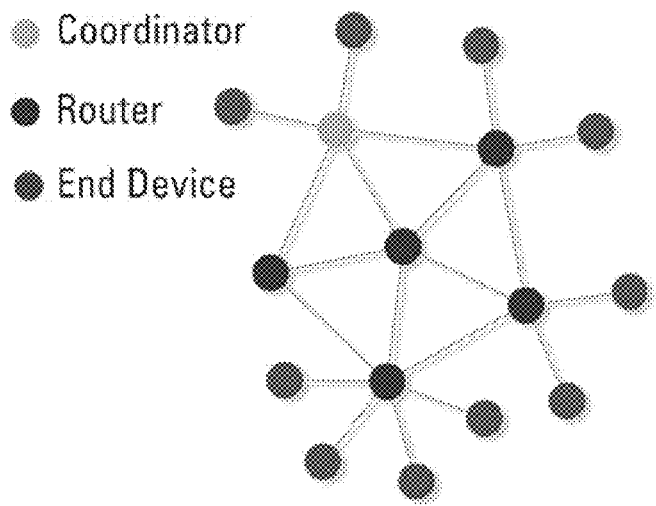
FIG. 4A shows an exemplary mesh network.
Figure 4B:
FIG. 4B shows exemplary reports on a city block using the system of FIGS. 1A-1B.

FIG. 4 shows an exemplary mesh network. In this embodiment, ZigBee is used. However, the mesh network can be formed using WiFi, Bluetooth, or any other suitable wireless area networks. ZigBee is a low-cost, low-power, wireless mesh network standard targeted at the wide development of long battery life devices in wireless control and monitoring applications. Zigbee devices have low latency, which further reduces average current. ZigBee chips are typically integrated with radios and with microcontrollers that have between 60-256 KB flashes memory. ZigBee operates in the industrial, scientific and medical (ISM) radio bands: 2.4 GHz in most jurisdictions worldwide; 784 MHz in China, 868 MHz in Europe and 915 MHz in the USA and Australia. Data rates vary from 20 kbit/s (868 MHz band) to 18 kbit/s (2.4 GHz band). The ZigBee network layer natively supports both star and tree networks, and generic mesh networking. Every network must have one coordinator device, tasked with its creation, the control of its parameters and basic maintenance. Within star networks, the coordinator must be the central node. Both trees and meshes allow the use of ZigBee routers to extend communication at the network level. ZigBee builds on the physical layer and media access control defined in IEEE standard 802.15.4 for low-rate WPANs. The specification includes four additional key components: network layer, application layer, ZigBee device objects (ZDOs) and manufacturer-defined application objects which allow for customization and favor total integration. ZDOs are responsible for some tasks, including keeping track of device roles, managing requests to join a network, as well as device discovery and security. ZigBee is one of the global standards of communication protocol formulated by the significant task force under the IEEE 802.15 working group. The fourth in the series, WPAN Low Rate/ZigBee is the newest and provides specifications for devices that have low data rates, consume very low power and are thus characterized by long battery life. Other standards like Bluetooth and IrDA address high data rate applications such as voice, video and LAN communications.

ZigBee devices are of three kinds: ZigBee Coordinator (ZC): The most capable device, the Coordinator forms the root of the network tree and might bridge to other networks. There is precisely one ZigBee Coordinator in each network since it is the device that started the network originally (the ZigBee LightLink specification also allows operation without a ZigBee Coordinator, making it more usable for over-the-shelf home products). It stores information about the network, including acting as the Trust Center & repository for security keys. ZigBee Router (ZR): As well as running an application function, a Router can act as an intermediate router, passing on data from other devices. ZigBee End Device (ZED): Contains just enough functionality to talk to the parent node (either the Coordinator or a Router); it cannot relay data from other devices. This relationship allows the node to be asleep a significant amount of the time thereby giving long battery life. A ZED requires the least amount of memory, and, therefore, can be less expensive to manufacture than a ZR or ZC. The current ZigBee protocols support beacon and non-beacon enabled networks. In non-beacon-enabled networks, an unspotted CSMA/CA channel access mechanism is used. In this type of network, ZigBee Routers typically have their receivers continuously active, requiring a more robust power supply. However, this allows for heterogeneous networks in which some devices receive continuously while others only transmit when an external stimulus is detected. The typical example of a heterogeneous network is a wireless light switch: The ZigBee node at the lamp may constantly receive, since it is connected to the mains supply, while a battery-powered light switch would remain asleep until the switch is thrown. The switch then wakes up, sends a command to the lamp, receives an acknowledgment, and returns to sleep. In such a network the lamp node will be at least a ZigBee Router, if not the ZigBee Coordinator; the switch node is typically a ZigBee End Device. In beacon-enabled networks, the special network nodes called ZigBee Routers transmit periodic beacons to confirm their presence to other network nodes. Nodes may sleep between beacons, thus lowering their duty cycle and extending their battery life. Beacon intervals depend on data rate; they may range from 15.36 milliseconds to 251.65824 seconds at 18 kbit/s, from 24 milliseconds to 393.216 seconds at 40 kbit/s and from 48 milliseconds to 786.432 seconds at 20 kbit/s. However, low duty cycle operation with long beacon intervals requires precise timing, which can conflict with the need for low product cost. In general, the ZigBee protocols minimize the time the radio is on, so as to reduce power use. In beaconing networks, nodes only need to be active while a beacon is being transmitted. In non-beacon-enabled networks, power consumption is decidedly asymmetrical: Some devices are always active while others spend most of their time sleeping. Except for the Smart Energy Profile 2.0, ZigBee devices are required to conform to the IEEE 802.15.4-2003 Low-Rate Wireless Personal Area Network (LR-WPAN) standard. The standard specifies the lower protocol layers—the physical layer (PHY), and the Media Access Control portion of the data link layer (DLL). The basic channel access mode is "carrier sense, multiple access/collision avoidance" (CSMA/CA). That is, the nodes talk in the same way that humans converse; they briefly check to see that no one is talking before he or she start, with three notable exceptions. Beacons are sent on a fixed timing schedule and do not use CSMA. Message acknowledgments also do not use CSMA. Finally, devices in beacon-enabled networks that have low latency real-time requirements may also use Guaranteed Time Slots (GTS), which by definition do not use CSMA.

Figure 5:
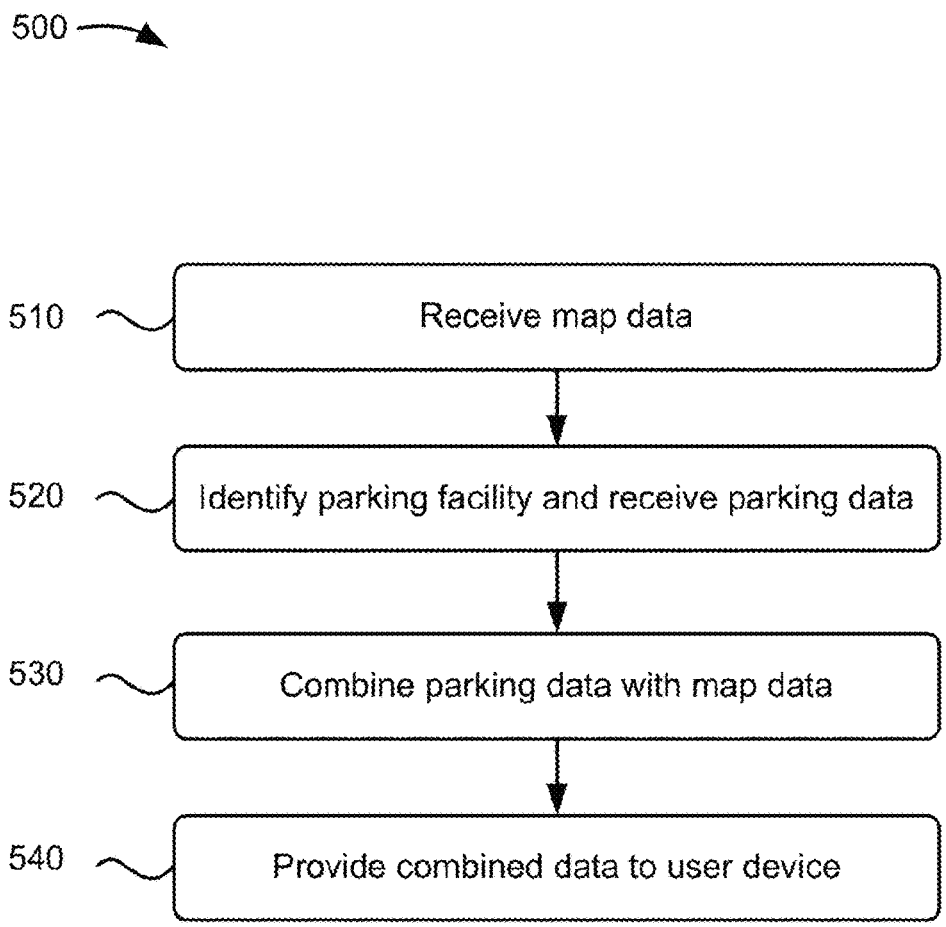
FIG. 5 illustrates a flowchart of an example process 500 for providing parking information to user device.

FIG. 5 illustrates a flowchart of an example process 500 for providing parking information to user device 19. In one implementation, process 500 may be performed by one or more components of app server 18. In another implementation, some or all of blocks of process 500 may be performed by one or more components of another device in environment 200 (e.g., user device 19, controller device 230 or map server 240), or a group of devices including or excluding app server 18.

As shown in FIG. 5, process 500 may include receiving map data (block 510). For example, app server 18 may receive map data when a user of user device 19 selects an application to identify parking facilities in a particular geographic area. In some implementations, the particular geographic area may be provided by the user of user device 19 (e.g., via user interaction with a user interface to select the area on a map displayed on user device 19). Additionally, or alternatively, the particular geographic area may be based on a current location of user device 19 (e.g., as determined by a global positioning system (GPS) device of user device 19 and/or determined using another technique). In some implementations, app server 18 may receive the map data from map server 240 and/or from some other source.

In some implementations, the map data may include a geographic map (e.g., a road map or some other type of geographic map) corresponding to the particular geographic area. In some implementations, the map data may include information identifying parking facilities within the particular geographic area. Additionally, the map data may include information identifying a layout of a parking facility (e.g., a blueprint of the parking facility, a number of levels in the parking facility, a number of parking spaces in the parking facility, etc.). Process 500 may further include identifying a parking facility and receiving parking data (block 520). For example, app server 18 may identify a parking facility within the particular geographic area based on the map data. In some implementations, app server 18 may receive parking data from a particular controller device 230 associated with the identified parking facility. For example, app server 18 may query controller device 230 for the parking data. Additionally, or alternatively, controller device 230 may broadcast the parking data in a manner that allows app server 18 to receive the parking data. In some implementations, the parking data may identify an entry location of the parking facility, and/or an indication that identifies available and/or unavailable parking spaces (e.g., a number of available and/or unavailable parking spaces, a pattern and/or color that indicates a number of available and/or unavailable parking spaces, etc.).

Additionally, or alternatively, the parking data may include information that identifies some other information relating to a parking space (e.g., a parking fee associated with the parking space, a size of the parking space, a type of the parking space, a level in which the parking space is located, a distance between the parking space and an elevator and/or staircase located in the parking facility, etc.). In some implementations, the parking data may correspond to information stored by data structure 400. Process 500 may further include combining the parking data with the map data (block 530). For example, app server 18 may combine the parking data with the map data to form combined data. In some implementations, the combined data may be used to generate a map having the parking data overlaid on a map associated with the map data. Process 500 may also include providing the combined data to the user device (block 540). For example, app server 18 may provide the combine data to user device 19 to cause user device 19 to display the map having parking data overlaid on the map. An example of a map with the parking data overlaid on the map is described above with respect to interface 100.

While a particular series of blocks has been described above with regard to FIG. 5, the operations, data flows, and/or the order of the blocks may be modified in other implementations. Further, non-dependent operations and/or data flows may be performed in parallel.

Figure 6:
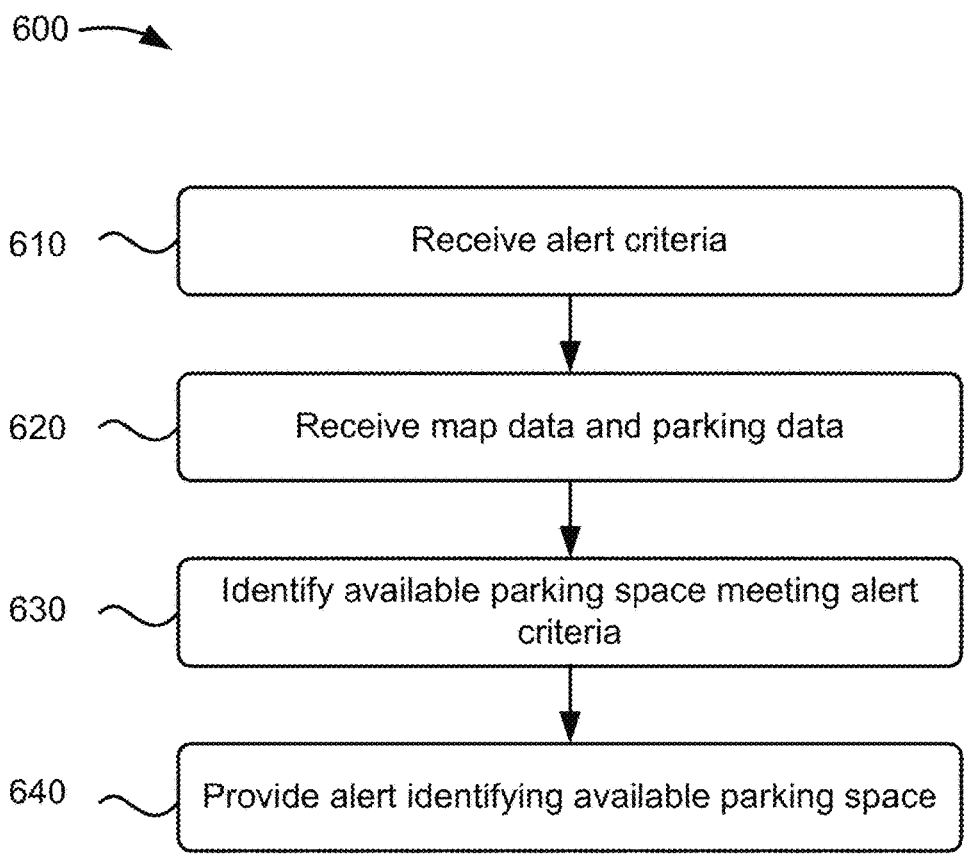
FIG. 6 illustrates a flowchart of an example process for alerting a motorist of an available parking space meeting particular criteria.

FIG. 6 illustrates a flowchart of an example process 600 for alerting a motorist of an available parking space meeting particular criteria. In one implementation, process 600 may be performed by one or more components of user device 19. In another implementation, some or all of blocks of process 600 may be performed by one or more components of another device in environment 200 (e.g., controller device, map server, or app server), or a group of devices including or excluding user device 19.

As shown in FIG. 6, process 600 may include receiving alert criteria (block 610). For example, a user of user device 19 may provide the alert criteria (e.g., via a user interface of user device 19) to direct user device 19 to provide an alert when an available parking space, meeting the alert criteria, is identified. In some implementations, the alert criteria may identify a threshold distance between a location of user device 19 and the parking space, a threshold distance between the parking space and some other location (e.g., a landmark, a point of interest, an elevator in a parking facility associated with the parking space, etc.), a threshold parking fee of the parking space, a particular type of parking space, and/or some other information associated with the parking space. Additionally, or alternatively, an alert criteria may identify a time of day or some other information used to provide an alert.

Process 600 may further include receiving map data and parking data (block 620). For example, user device 19 may receive map data from app server 220, map server 240 and/or from some other source (e.g., from a storage medium, such as a digital video disc (DVD)). In some implementations, the map data may include a map of a particular geographic area identified by a user of user device 19 (e.g., via a user interface of user device 19). In some implementations, user device 19 may identify a parking facility based on the map data and may receive parking data for the parking facility from controller device 230 (e.g., in a similar manner as described above with respect to blocks 510 and 520). Additionally, or alternatively, app server 220 may identify a parking facility based on the map data and may receive parking data for the parking facility from controller device 230 and provide the parking data for the parking facility to user device 19.

Process 600 may also include identifying an available parking space meeting the alert criteria (block 630). For example, user device 19 may identify an available parking space meeting the alert criteria based on the alert criteria, the map data, and/or the parking data. As an example, assume that the alert criteria identify a threshold distance from a particular location and identify a particular parking space type. Further, assume that user device 19 moves to a position within the threshold distance of the particular location. Further, assume that the parking data identifies an available parking space having the particular parking space type. Given these assumptions, user device 19 may identify that the available parking space meets the alert criteria.

Process 600 may further include providing an alert identifying the available parking space (block 640). For example, user device 19 may provide an alert based on identifying the available parking space meeting the alert criteria. In some implementations, user device 19 may display the alert on a display of user device 19. Additionally, or alternatively, user device 19 may display a map identifying the geographic location of the available parking space. In some implementations, the map may display a location of user device 19 and may display directions to the available parking space. Additionally, or alternatively, the map may display the parking data overlaid on the map.

While a particular series of blocks has been described above with regard to FIG. 6, the operations, data flows, and/or the order of the blocks may be modified in other implementations. Further, non-dependent operations and/or data flows may be performed in parallel. In some implementations, app server 18 may perform some or all of process 600. For example, app server 18 may receive alert criteria from user device 19, may receive map data and parking data from map server 240 and/or a storage medium, may identify an available parking space meeting the alert criteria (e.g., by receiving geographic location information associated with user device 19), and/or may provide an alert, to user device 19, identifying the available parking space.

Figure 7:
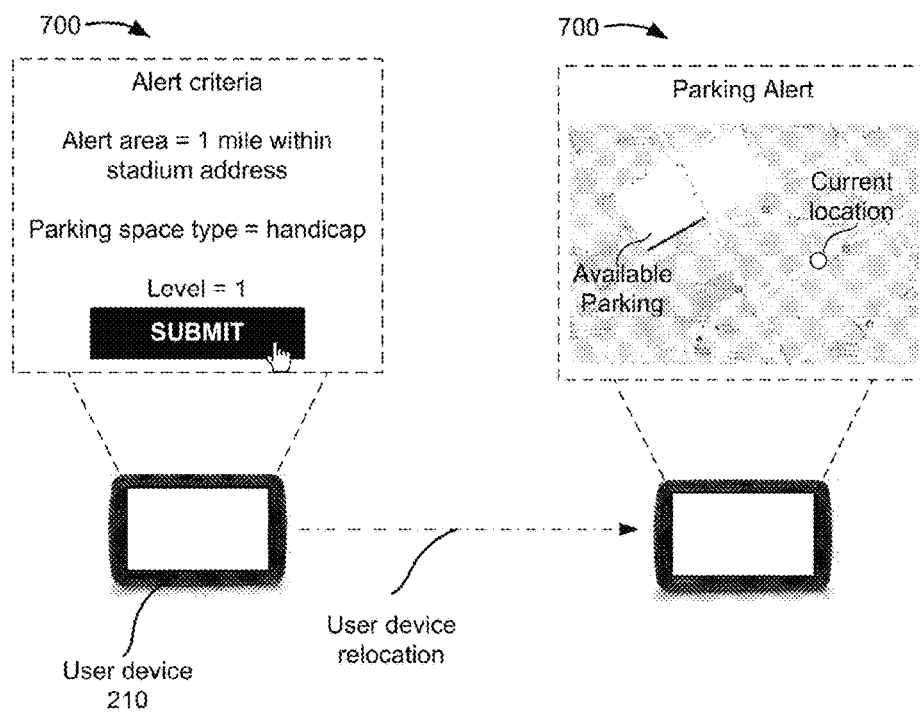
FIG. 7 illustrates an example implementation of a UI to display matching parking spaces.

FIG. 7 illustrates an example implementation as described herein. As shown in FIG. 7, a user of user device 19 may provide alert criteria via a user interface of user device 19 (e.g., interface 700). For example, assume that the user provides alert criteria, such as an alert area (e.g., a one-mile radius within a street address of a stadium), a parking space type (e.g., a handicap parking space type), and a level corresponding to where the parking space is located in a parking facility (e.g., level one or ground level). Further, assume that user device 19 relocates to a geographic location that is within a one-mile radius of the street address of the stadium. Further, assume that user device 19 identifies an available parking space meeting the alert criteria provided by the user (e.g., as described above with respect to process 600). Given these assumptions, user device 19 may provide an alert that identifies an available parking space meeting the alert criteria.

Additionally, user device 19 may display a map having information that identifies a location of the available parking space. For example, as described above, user device 19 may display a map having parking data overlaid on the map, as described above (e.g., a color or pattern overlaid on the map that represents available parking) Additionally, or alternatively, user device 19 may display directions to the available parking space. Additionally, or alternatively, user device 19 may display a list of parking facilities having available parking in order of distance between user device 19 and the parking facilities (or in some other order).

While a particular example is shown in FIG. 7, it will be apparent that the above description is merely an example implementation. For example, in practice, interface 700 may appear different and may have a different format that what is shown in FIG. 7. Also, user device 19 may receive any number of criteria not described above, such as a time of day, a threshold distance between a parking space and an exit of a corresponding parking facility, a parking facility type (e.g., a garage, a lot, street parking, etc.), a threshold parking fee, and/or some other criteria.

Figure 8:
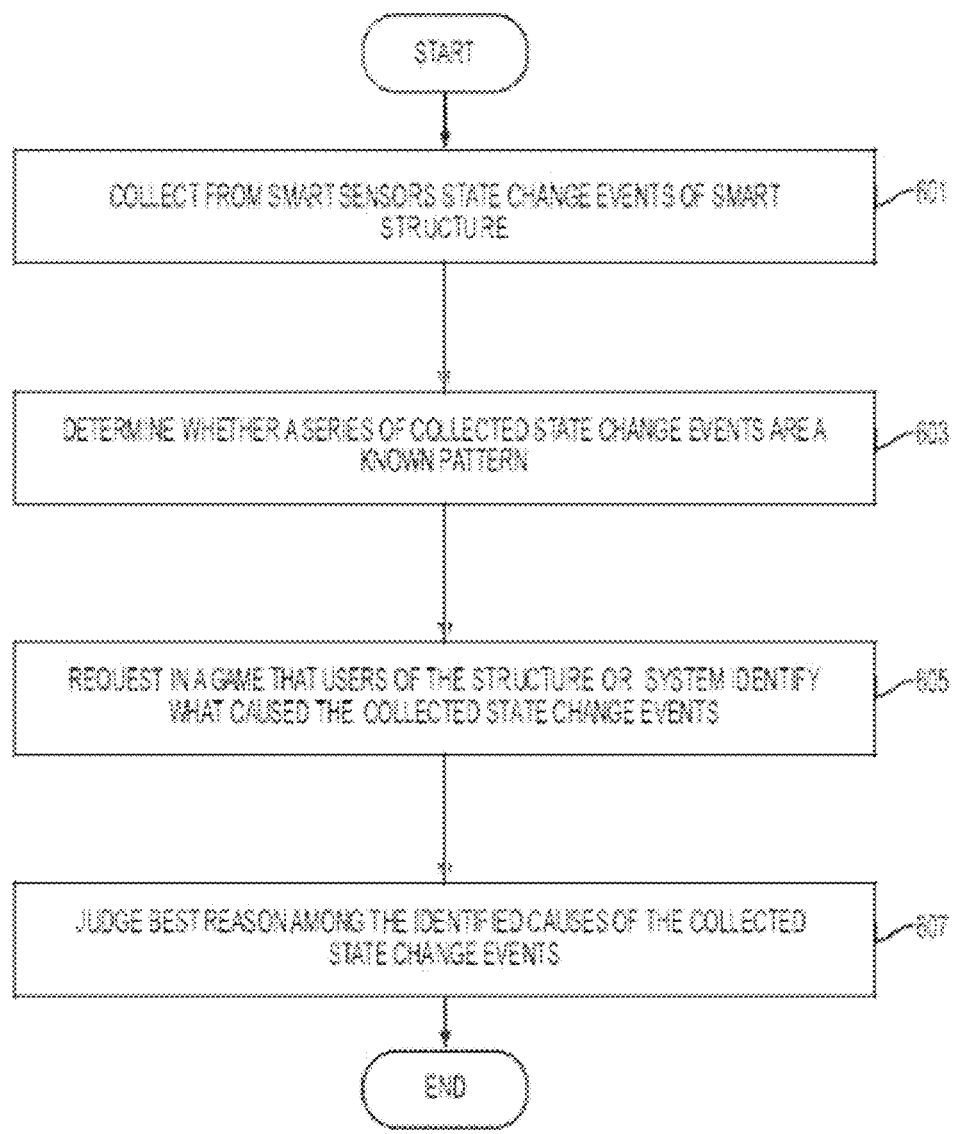
FIG. 8 shows an exemplary process to identify reasons for sensor data changes using a gaming process.

FIG. 8 is a flowchart of a method of an embodiment of the present disclosure. Referring to FIG. 8, a smart system may collect from smart devices state change events of a smart system in operation 601. That is, the smart system of FIG. 4 collects information on each of the group of devices, the smart devices, the smart appliances, the security devices, the lighting devices, the energy devices, and the like. The state change events indicate when there is a change in the state of the device or the surrounding environment. The state change events are stored by the smart system. In operation 603, the system may determine whether a series of the collected state change events are a known pattern. That is, the gateway determines whether there are events which have been correlated or identified in the past. If the collected state change events have been identified in the past, it may be necessary to determine that the smart systems trusts the identification the collected state change events. The trust factor of the identification of the collected state change events may be determined by the number of users who have identified the collected state change events or the number of time collected state change events have been repeated and identified. In operation 605, when the series of the collected state change events is an unknown pattern, request users of the smart system to identify what caused the collected state change events request. That is, the system transmits to a gamification application (hereinafter app) on the user's mobile device a request to identify the collected state change events. The gamification app displays the information and request the user enter information identifying the collected state change events. Each of the mobile devices transmits this information back to the system to the gamification module. In operation 605, the system transmits the each user's identified collected state change events to the other user's of the smart home system and they each vote on the best identification of the collected state change events. Thus, the identified collected change state events that have been repeatedly identified over a period of weeks increases, the trustworthiness of the identification increases. Likewise, if every user of the smart system makes the same identification of the collected change state events, the identified collected change state events may be considered trustworthy at point. Such a determination of a threshold for when the identified collected change state events are considered trustworthy and therefore need not be repeated, is made by a system administrator. However, it will be understood that such a trustworthiness of this type only gives higher confidence of this particular dataset at that point in time. As such further repetition is required, since the sensor data may have noise, the more datasets to be identified to the pattern, the more robust the trustworthiness will be. Until the robustness reaches a threshold, then the system can confirm this is a known trustworthy pattern.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein may be preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An Internet of Thing (IoT) device for a city, comprising:
    a street light enclosure mounted to a light pole, a traffic light, a government vehicle, a utility vehicle, or a city vehicle as a replacement for a conventional light source, comprising:
        a sensor;
        a camera to capture video;
        a microphone array;
        a processor coupled to the sensor;
        a graphics processor coupled to the processor to process video captured by the camera to identify one or more faces and to detect at least two of:
            traffic flow;
            one or more parked cars;
            one or more open parking spots;
            one or more license plate numbers; and
            make, model and color of one or more vehicles; and
        a wireless transceiver coupled to the processor; wherein
    a city wireless network coupled to the wireless transceiver to link with a plurality of other street lights working collectively to provide lighting and safety for the city, each city light having another light source, another microphone, another sensor, another processor and another wireless transceiver.

2. The IoT device of claim 1, comprising an electronic nose coupled to the processor.

3. The IoT device of claim 2, comprising a non-transitory storage medium with instructions stored therein that when executed on the processor causes the processor to to detect air pollution or odor from the electronic nose.

4. The IoT device of claim 2, comprising a non-transitory storage medium with instructions stored therein that when executed on the processor causes the processor to to detect crime using a combination of video, odor and sound.

5. The IoT device of claim 1, comprising a non-transitory storage medium with instructions stored therein that when executed on the processor causes the processor to to detect crime using a combination of video and sound.

6. The IoT device of claim 1, comprising a cloud based image processing system to receive images from the camera and recognize an image.

7. The IoT device of claim 1, comprising a non-transitory storage medium with instructions stored therein that when executed on the processor causes the processor to to detect sound direction of gunshot.

8. The IoT device of claim 1, comprising a wireless mesh network coupled to the wireless transceiver to transfer data from node to node.

9. The IoT device of claim 1, comprising a non-transitory storage medium with instructions stored therein that when executed on the processor causes the processor to to analyze stress from all sensors and predict individual component failure for replacement prior to component failure.

10. The IoT device of claim 1, comprising an energy capture unit coupled to the processor to supply power.

11. The IoT device of claim 1, comprising a vehicular radio transceiver to communicate with a smart car.

12. The IoT device of claim 1, comprising a non-transitory storage medium with instructions stored therein that when executed on the processor causes the processor to to detect car accident and request assistance from police or ambulance.

13. The IoT device of claim 1, comprising a non-transitory storage medium with instructions stored therein that when executed on the processor causes the processor to to minimize light pollution by lighting only with a moving person or vehicle in proximity to the light source.

14. The IoT device of claim 1, comprising a non-transitory storage medium with instructions stored therein that when executed on the processor causes the processor to to detect water pipe rupture.

15. The IoT device of claim 1, comprising a non-transitory storage medium with instructions stored therein that when executed on the processor causes the processor to to report a fire or emergency to a fire department.

16. The IoT device of claim 1, comprising a non-transitory storage medium with instructions stored therein that when executed on the processor causes the processor to to discover anomalies with a particular city block using big data analysis.

17. The IoT device of claim 16, comprising a non-transitory storage medium with instructions stored therein that when executed on the processor causes the processor to to divert traffic from the fire or emergency.

18. The IoT device of claim 1, comprising a non-transitory storage medium with instructions stored therein that when executed on the processor causes the processor to provide for providing city sensor data to a plurality of subscribers and requesting from the subscribers as a game to identify one or more reasons explaining city sensor data.

* * * * *